(12) United States Patent
Tsai et al.

(10) Patent No.: US 10,691,226 B2
(45) Date of Patent: Jun. 23, 2020

(54) INPUT DEVICE DETECTION SYSTEM AND METHOD

(71) Applicant: Primax Electronics Ltd., Taiwan (TW)

(72) Inventors: Cheng-Yi Tsai, Taipei (TW); Ying-Che Tseng, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 363 days.

(21) Appl. No.: 15/906,626

(22) Filed: Feb. 27, 2018

(65) Prior Publication Data
US 2019/0129523 A1 May 2, 2019

(30) Foreign Application Priority Data
Oct. 27, 2017 (TW) .............................. 106137174 A

(51) Int. Cl.
*G06F 3/0354* (2013.01)
*G06F 3/03* (2006.01)
*G06F 3/038* (2013.01)

(52) U.S. Cl.
CPC ........ *G06F 3/03543* (2013.01); *G06F 3/0304* (2013.01); *G06F 3/0317* (2013.01); *G06F 3/0383* (2013.01)

(58) Field of Classification Search
None
See application file for complete search history.

(56) References Cited

U.S. PATENT DOCUMENTS

| | | | |
|---|---|---|---|
| 2005/0231468 A1* | 10/2005 | Chen | G06F 3/016 345/156 |
| 2011/0032539 A1* | 2/2011 | Chang | G06F 3/0317 356/614 |

* cited by examiner

*Primary Examiner* — Matthew Yeung
(74) *Attorney, Agent, or Firm* — Kirton McConkie; Evan R. Witt

(57) ABSTRACT

An input device detection system includes a foundation, a cover plate and a trajectory detection plate. The foundation includes a base plate and plural first retractable rods. The base plate has a top surface, a bottom surface and a detection hole. The input device is pushed by the plural first retractable rods along a horizontal direction. The input device is pushed by plural second retractable rods of the cover plate along a vertical direction. The trajectory detection plate is located under the base plate. An optical sensing module of the input device emits a light beam. The light beam is transmitted through the detection hole and projected to the trajectory detection plate. When the trajectory detection plate is moved relative to the foundation and the light beam is reflected to the optical sensing module by the trajectory detection plate, a trajectory signal is generated.

18 Claims, 12 Drawing Sheets

INPUT DEVICE DETECTION SYSTEM AND METHOD

FIELD OF THE INVENTION

The present invention relates to a detection system, and more particularly to an input device detection system and an input device detection method.

BACKGROUND OF THE INVENTION

An input device such as a mouse is used to control a cursor on a computer screen in order to operate the computer. Since 1968, the United States of America has produced the world's first mouse. After then, the mouse is applied to paper processing operations, video games, industrial drawings, drawing design or media production. Consequently, the mouse has become an indispensable part of the computer system. In the early stage, the mouse uses a trackball to detect the displacement of the mouse. With increasing development of science and technology, an optical module or a laser module is used to detect the displacement of the mouse in order to enhance the working efficiency.

During the process of fabricating the mouse, the mouse is placed on a fixture with a different detection surface. By moving the mouse or moving the detection surface of the fixture, the detection system can realize whether the optical sensing module or the laser sensing module of the mouse is applicable to various surfaces. However, the conventional detection system still has some drawbacks. For example, when the mouse is placed on the fixture by the tester, the mouse is not accurately placed in the detection region or the mouse is not maintained in the horizontal status. Under this circumstance, an erroneous detection result is generated.

As mentioned above, if the input device is not accurately positioned when the optical sensing module or the laser sensing module of the input device is used, the detection result is possibly erroneous. For solving the above drawbacks, the present invention provides an input device detection system and an input device detection method for increasing the accuracy and the reliability of the detection result.

SUMMARY OF THE INVENTION

The present invention provides a detection system and a detection method for positioning the under-test input device. Consequently, the accuracy and the reliability of the detection result of the input device are effectively increased.

In accordance with an aspect of the present invention, there is provided an input device detection system for detecting an input device. The input device includes an optical sensing module. The input device detection system includes a foundation, a cover plate, a trajectory detection plate and a control device. The foundation includes a base plate, a frame and plural first retractable rods. The base plate has a top surface, a bottom surface and a detection hole. The input device is supported on the top surface. The second surface is opposed to the first surface. The detection hole runs through the top surface and the bottom surface. The frame is disposed on the top surface of the base plate. The plural first retractable rods are disposed on an inner surface of the frame. The input device is pushed and fixed by the plural first retractable rods along a horizontal direction. Consequently, the optical sensing module is moved to a position corresponding to the detection hole. The cover plate includes plural second retractable rods. The input device is pushed and fixed by the plural second retractable rods along a vertical direction. Consequently, the foundation is in a horizontal status. The trajectory detection plate is located under the base plate and near the bottom surface of the base plate. The control device is in communication with the input device, the foundation, the cover plate and the trajectory detection plate. The input device, the foundation, the cover plate and the trajectory detection plate are controlled by the control device. The optical sensing module emits a light beam, and the light beam is transmitted through the detection hole and projected to the trajectory detection plate. When the trajectory detection plate is moved relative to the foundation and the light beam is reflected to the optical sensing module by the trajectory detection plate, the input device generates a trajectory signal.

In an embodiment, the foundation further includes at least one horizontal status detector, and the at least one horizontal status detector senses whether the foundation is in the horizontal status.

In an embodiment, the at least one horizontal status detector is disposed on the base plate or the frame.

In an embodiment, the horizontal status detector is a gravity force sensor or a gyroscope.

In an embodiment, a concave structure is formed in the top surface of the base plate. The input device is accommodated within the concave structure. Consequently, the optical sensing module is aligned with the detection hole.

In an embodiment, the foundation further includes a first pressure pump. The control device controls the first pressure pump to drive the first retractable rods to be extended or retracted along the horizontal direction.

In an embodiment, the cover plate further includes a second pressure pump. The control device controls the second pressure pump to drive the second retractable rods to be extended or retracted along the vertical direction.

In an embodiment, the cover plate includes an image pickup module, and the appearance image of the input device is captured by the image pickup module.

In an embodiment, the trajectory detection plate includes a supporting plate, a first surface layer and a moving device. The first surface layer is disposed on the supporting plate. The light beam is reflected to the optical sensing module by the first surface layer.

In an embodiment, when the moving device is enabled to move the trajectory detection plate, the trajectory detection plate is moved relative to the foundation.

In an embodiment, the first surface layer of the trajectory detection plate is replaced with a second surface layer through the moving device.

In an embodiment, after the control device receives the trajectory signal, the control device generates a detection result according to the trajectory signal.

In an embodiment, the control device is a computing device.

In accordance with another aspect of the present invention, there is provided an input device detection method for detecting an input device. The input device includes an optical sensing module. The input device detection method includes the following steps. In a step (a), the input device is placed on a foundation. In a step (b), an appearance image of the input device is captured. In a step (c), plural first retractable rods of the foundation push the input device along a horizontal direction, so that the optical sensing module is moved to a position corresponding to a detection hole of the foundation. Then, a step (d) is performed to judge whether the foundation is in a horizontal status. If the foundation is not in the horizontal status, the input device is pushed by plural second retractable rods of a cover plate along the vertical direction, so that the foundation is adjusted to the horizontal status. If the foundation is in the horizontal status, a next step is performed. In a step (e), the input device is fixed by the plural first retractable rods and the plural second retractable rods. In a step (f), the input device is enabled. In a step (g), a trajectory detection plate under the foundation is moved, so that a trajectory of the input device is detected. In a step (h), a detection result is generated. In a step (i), the detection result is recorded.

Preferably, in the step (c), the input device is accommodated within a concave structure of the foundation, so that the optical sensing module is aligned with the detection hole.

Preferably, when the input device is enabled in the step (f), the optical sensing module emits a light beam. The light beam is transmitted through the detection hole and projected to the trajectory detection plate.

In an embodiment, the step (g) includes the following steps. In a step (g1), the trajectory detection plate having a first surface layer is provided. In a step (g2), the trajectory detection plate is moved. Consequently, a trajectory signal corresponding to the first surface layer is detected. In a step (g3), the trajectory detection plate having the first surface layer is replaced with a second trajectory detection plate having a second surface layer. In a step (g4), the second trajectory detection plate is moved. Consequently, a second trajectory signal corresponding to the second surface layer is detected.

In an embodiment, when the detection result is generated in the step (h), a detection completing signal is further generated.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
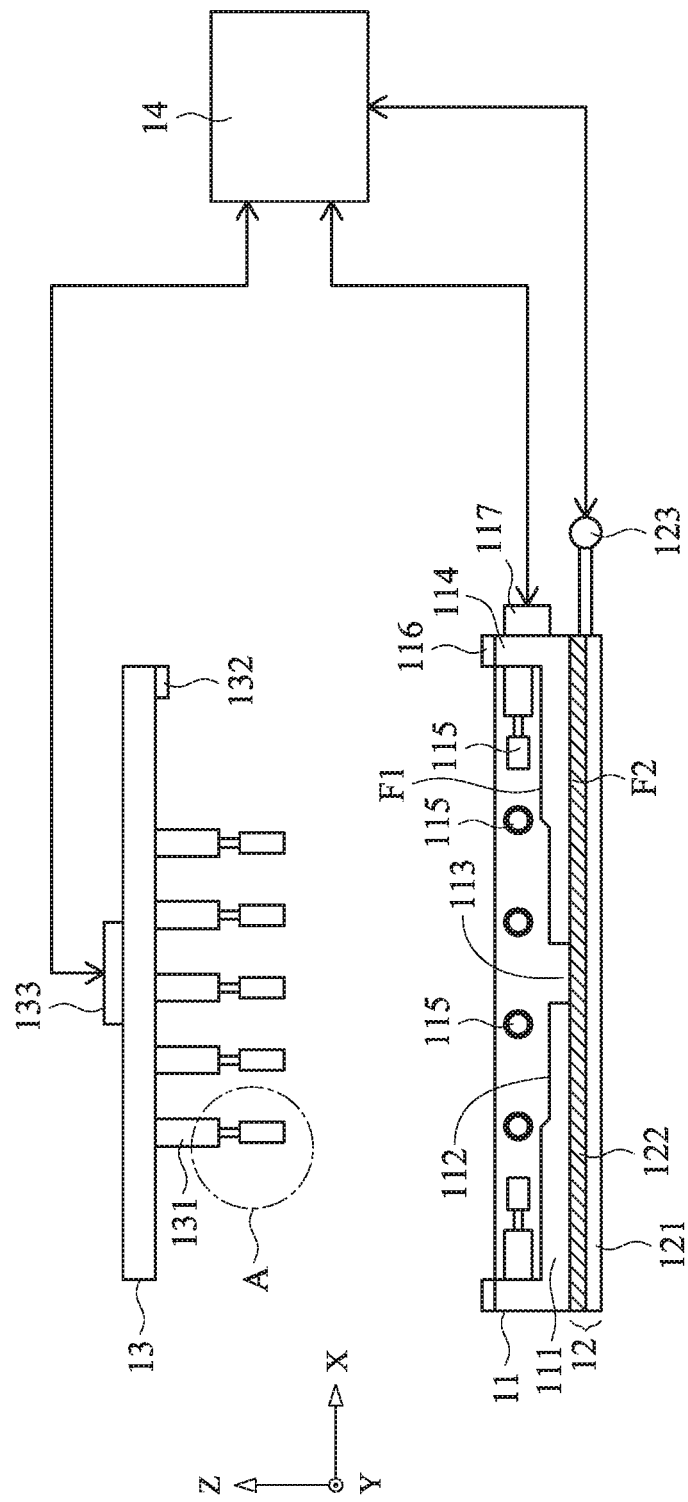
FIG. 1A schematically illustrates an input device detection system according to an embodiment of the present invention.

Please refer to FIG. 1A. FIG. 1A schematically illustrates an input device detection system according to an embodiment of the present invention. The input device detection system 10 is used for detecting an input device with an optical sensing module. For example, the input device is a mouse. The input device detection system 10 comprises a foundation 11, a trajectory detection plate 12, a cover plate 13 and a control device 14. The control device 14 is in communication with the foundation 11, the trajectory detection plate 12 and the cover plate 13 in a wired transmission manner or a wireless transmission manner. Consequently, the motions of the foundation 11, the trajectory detection plate 12 and the cover plate 13 are controlled by the control device 14. For example, the control device 14 is a computing device with a monitor (not shown). For clarification, the three orthogonal axes as shown in FIG. 1A are defined as an X axis, a Y axis and a Z axis, respectively. Moreover, the X axis and the Y axis are arranged along a horizontal direction, and the Z axis is arranged along a vertical direction.

Please refer to FIG. 1A again. The foundation 11 comprises a base plate 111 and a frame 114. The base plate 111 has a top surface F1 and a bottom surface F2. A concave structure 112 is formed in the top surface F1. The foundation 11 further comprises a detection hole 113. The detection hole 113 is disposed in the concave structure 112. Moreover, the detection hole 113 runs through the top surface F1 and the bottom surface F2. The frame 114 is disposed on a periphery region of the top surface F1. Moreover, plural first retractable rods 115 are disposed on an inner surface of the frame 114. The first retractable rods 115 can be extended or retracted along the horizontal direction. The foundation 11 further comprises a first pressure pump 117. The first pressure pump 117 is in communication with the first retractable rods 115. For succinctness, the connections between the first pressure pump 117 and the first retractable rods 115 are not shown. Under control of the control device 14, the first pressure pump 117 drives the first retractable rods 115 to be extended or retracted along the horizontal direction. Moreover, at least one horizontal status detector 116 is disposed on the frame 114 to detect whether the foundation 11 is in an aslant status or in a horizontal status. In an embodiment, the horizontal status detector 116 is a gravity force sensor or a gyroscope. In this embodiment, the horizontal status detector 116 is disposed on the frame 114. It is noted that the position of the horizontal status detector 116 is not restricted. For example, in another embodiment, the horizontal status detector 116 is disposed on the base plate 111.

Please refer to FIG. 1A again. The trajectory detection plate 12 is located under the base plate 11 and located near the bottom surface F2. In an embodiment, the trajectory detection plate 12 comprises a supporting plate 121, a first surface layer 122 and a moving device 123. The first surface layer 122 is disposed on the supporting plate 121. The moving device 123 is fixed on a lateral side of the supporting plate 121 and the first surface layer 122. Under control of the control device 14, the moving device 123 is enabled to move the trajectory detection plate 12. Consequently, the trajectory detection plate 12 is moved relative to the foundation 11.

Please refer to FIG. 1A again. The cover plate 13 comprises plural second retractable rods 131, an image pickup module 132 and a second pressure pump 133. The second pressure pump 133 can be extended or retracted along the vertical direction. The second pressure pump 133 is in communication with the second retractable rods 131. For succinctness, the connections between the second pressure pump 133 and the second retractable rods 131 are not shown. Under control of the control device 14, the second pressure pump 133 drives the second retractable rods 131 to be extended or retracted along the vertical direction. Moreover, the control device 14 can control the image pickup module 132 to capture an appearance image of an under-test input device. In an embodiment, the first pressure pump 117 and the second pressure pump 133 are air pressure pumps or hydraulic pumps.

Figure 1B:
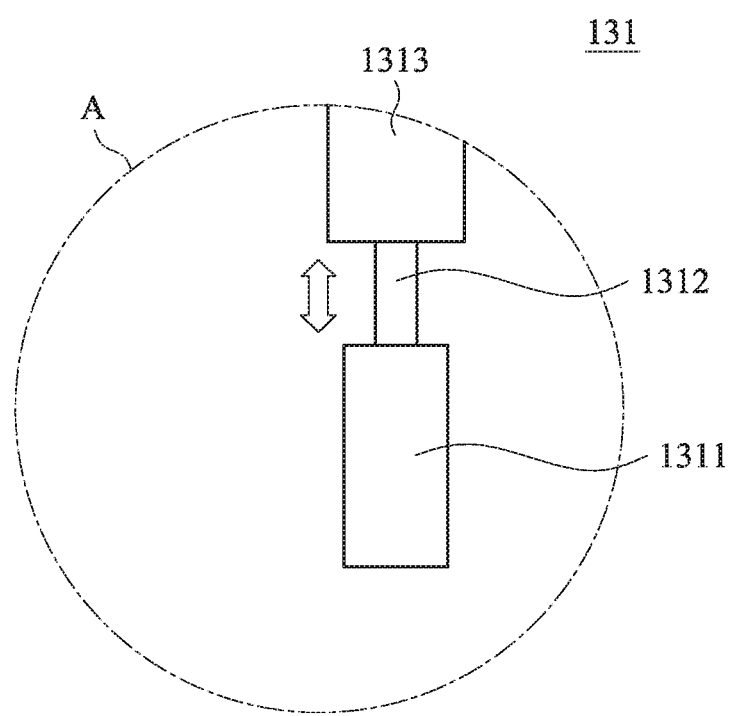
FIG. 1B is a schematic enlarged fragmentary side view illustrating the region A of the input device detection system as shown in FIG. 1A.

Please refer to FIG. 1B. FIG. 1B is a schematic enlarged fragmentary side view illustrating the region A of the input device detection system as shown in FIG. 1A. As shown in FIG. 1B, the second retractable rod 131 comprises a pedestal part 1313, a retractable part 1312 and a press part 1311. The pedestal part 1313 is connected with the cover plate 13 (see FIG. 1A). The retractable part 1312 is storable within the pedestal part 1313. As the pressure of the second pressure pump 133 (see FIG. 1A) is increased, the retractable part 1312 is protruded out of the pedestal part 1313. Consequently, the press part 1311 is moved in the direction away from the pedestal part 1313. As the pressure of the second pressure pump 133 is decreased, the retractable part 1312 is retracted back to the pedestal part 1313. Consequently, the press part 1311 is moved in the direction toward the pedestal part 1313. Consequently, the second retractable rod 131 is extended or retracted along the vertical direction.

Figure 2A:
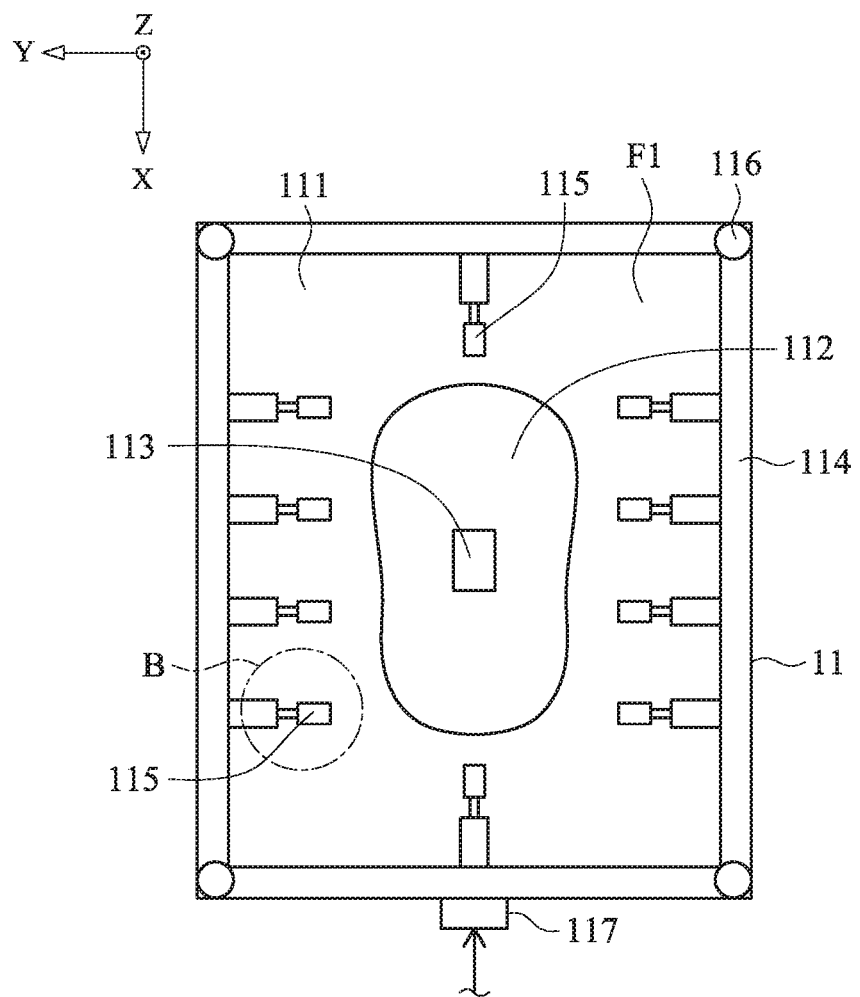
FIG. 2A is a schematic top view illustrating a first example of the foundation of the input device detection system according to the embodiment of the present invention.

FIG. 2A is a schematic top view illustrating a first example of the foundation of the input device detection system according to the embodiment of the present invention. As shown in FIG. 2A, the frame 114 is disposed on the periphery region of the top surface F1 of the base plate 111. The first pressure pump 117 is located beside the frame 114. The plural first retractable rods 115 are disposed on the inner surface of the frame 114. The first retractable rods 115 can be extended or retracted along the horizontal direction. The horizontal status detectors 116 are disposed on four corners of the frame 114, respectively. The shape of the concave structure 112 formed in the top surface F1 matches the shape of the bottom surface of the under-test input device. According to the shape of the bottom surface of the input device, the detection hole 113 is aligned with the optical sensing module of the input device. In this embodiment, the first retractable rods 115 are located at four lateral sides of the frame 114. It is noted that the positions of the first retractable rods 115 are not restricted. For example, in another embodiment, the first retractable rods 115 are located at four corners of the frame 114.

Figure 2B:
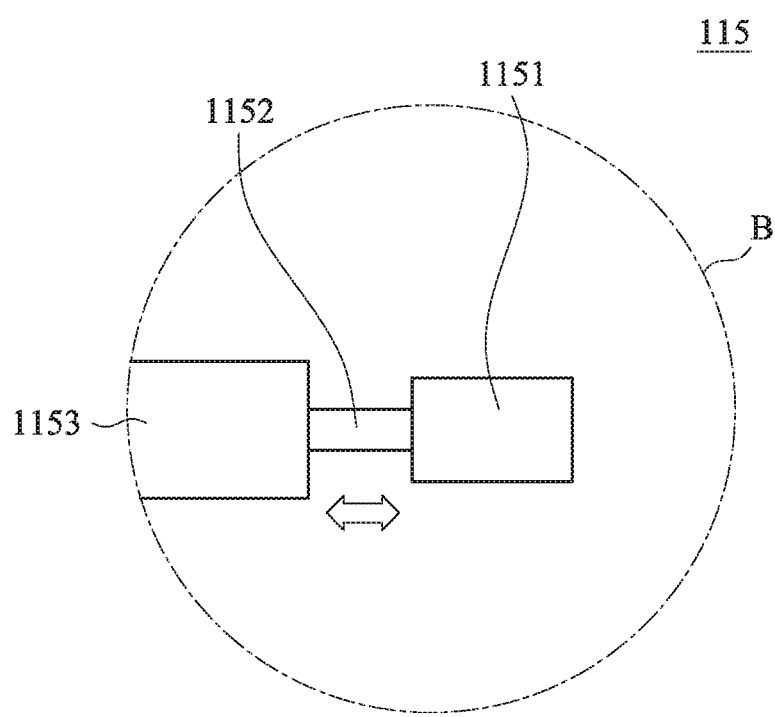
FIG. 2B is a schematic enlarged fragmentary side view illustrating the region B of the foundation of the input device detection system as shown in FIG. 2A.

Please refer to FIG. 2B. FIG. 2B is a schematic enlarged fragmentary side view illustrating the region B of the foundation of the input device detection system as shown in FIG. 2A. The first retractable rod 115 comprises a pedestal part 1153, a retractable part 1152 and a press part 1151. The pedestal part 1153 is connected with the frame 114 (see FIG. 1A). The retractable part 1152 is storable within the pedestal part 1153. As the pressure of the first pressure pump 117 (see FIG. 1A) is increased, the retractable part 1152 is protruded out of the pedestal part 1153. Consequently, the press part 1151 is moved in the direction away from the pedestal part 1153. As the pressure of the first pressure pump 117 is decreased, the retractable part 1152 is retracted back to the pedestal part 1153. Consequently, the press part 1151 is moved in the direction toward the pedestal part 1153. Consequently, the first retractable rod 115 is extended or retracted along the horizontal direction.

Figure 3:
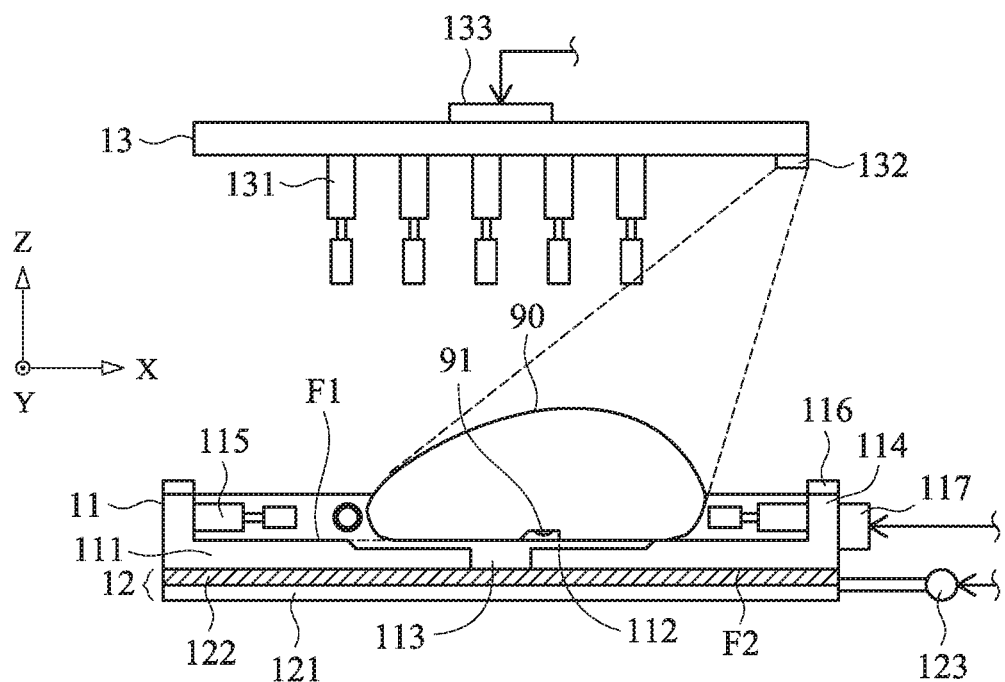
FIG. 3 schematically illustrates the use of the input device detection system to capture the appearance image of the input device.
Figure 4:
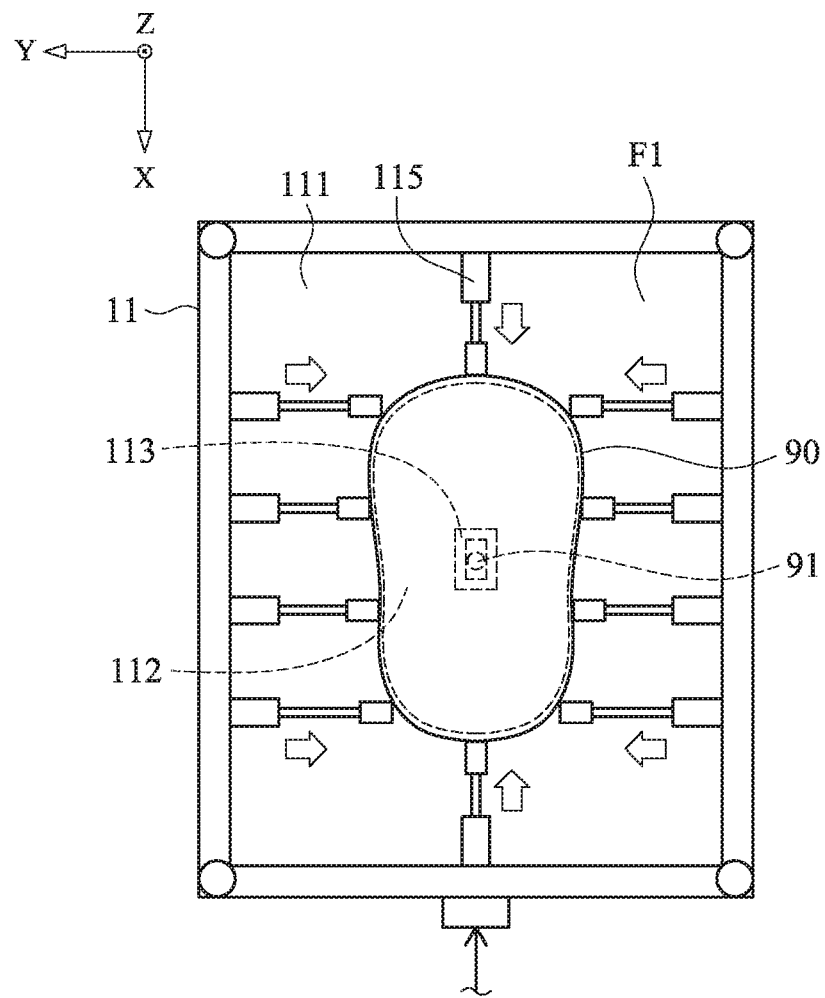
FIG. 4 schematically illustrates the use of the foundation of the input device detection system to push the input device.

Please refer to FIGS. 3 and 4. FIG. 3 schematically illustrates the use of the input device detection system to capture the appearance image of the input device. FIG. 4 schematically illustrates the use of the foundation of the input device detection system to push the input device. As shown in FIG. 3, an optical sensing module 91 is disposed on a bottom surface of the input device 90. The input device 90 is in communication with the control device 14 in a wired transmission manner or a wireless transmission manner. Moreover, the resolution or other parameters of the optical sensing module 91 may be previously set through the control device 14. Consequently, the sensitivity of the input device 90 is adjustable. Then, the input device 90 is manually or mechanically placed on the top surface F1 of the base plate 111. In case that the input device 90 is not accurately placed within the concave structure 112, the optical sensing module 91 on the bottom surface of the input device 90 is not precisely aligned with the detection hole 113. Then, the control device 14 controls the image pickup module 132 to capture the appearance image of the input device 90 and analyzes the shape, the size and the placed position of the input device 90. Please refer to FIG. 4. After the shape, the size and the placed position of the input device 90 are analyzed, the control device 14 drives the first retractable rods 115 to be extended or retracted along the horizontal direction. Since the lateral periphery of the input device 90 is pushed by the first retractable rods 115, the input device 90 is moved to the concave structure 112. Meanwhile, the optical sensing module 91 is precisely aligned with the detection hole 113.

Figure 5:
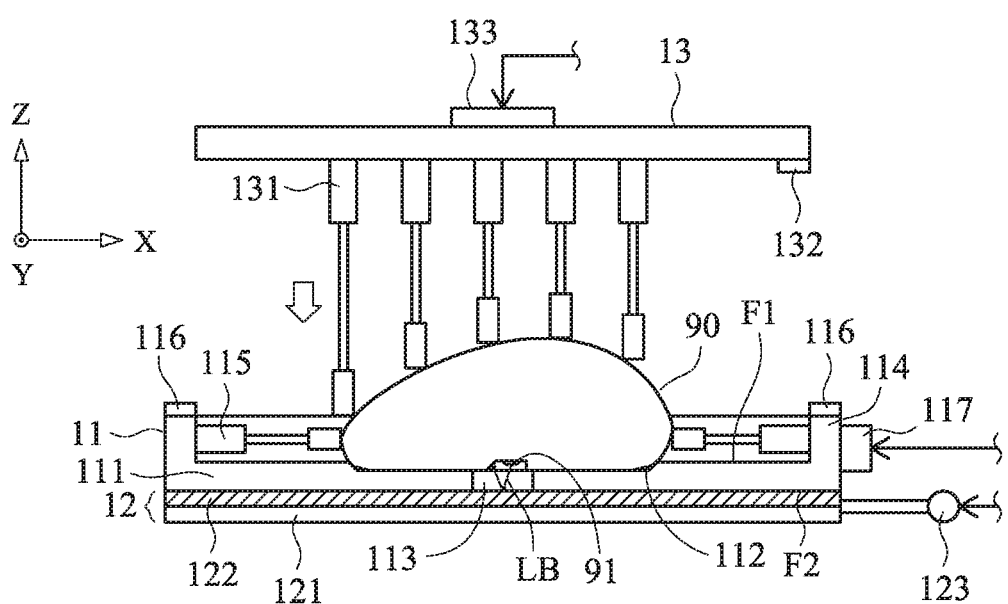
FIG. 5 schematically illustrates the use of the cover plate of the input device detection system to push the input device.

Please refer to FIG. 5. FIG. 5 schematically illustrates the use of the cover plate of the input device detection system to push the input device. After the input device 90 is pushed to the concave structure 112 by the first retractable rods 115, the lateral periphery of the input device 90 is continuously pressed by the first retractable rods 115. Consequently, the input device 90 is fixed in the concave structure 112, and the optical sensing module 91 is securely and precisely aligned with the detection hole 113. Then, the control device 14 drives the second retractable rods 131 of the cover plate 13 to push the top surface of the input device 90 along the vertical direction. At the same time, the at least one horizontal status detector 116 on the frame 114 detects whether the foundation 11 is in an aslant status or in a horizontal status. If the foundation 11 is still in the aslant status, the control device 14 continuously drives the second retractable rods 131 of the cover plate 13 to push the top surface of the input device 90 along the vertical direction. In addition, the control device 14 drives the second retractable rods 131 of the cover plate 13 to press the foundation 11 through the input device 90 until the horizontal status detector 116 detects the horizontal status of the foundation 11. After the foundation 11 is in the horizontal status, the second retractable rods 131 of the cover plate 13 continuously pushes the top surface of the input device 90. Consequently, the input device 90 is fixed in the concave structure 112 along the vertical direction.

Please refer to FIG. 5 again. After the input device 90 is fixed by the first retractable rods 115 and the second retractable rods 131, the control device 14 enables the input device 90. After the input device 90 is enabled, the optical sensing module 91 of the input device 90 emits a light beam LB. After the light beam LB is transmitted through the detection hole 113, the light beam LB is projected to the first surface layer 122 of the trajectory detection plate 12. Then, the light beam LB is reflected to the optical sensing module 91 by the first surface layer 122.

Figure 6:
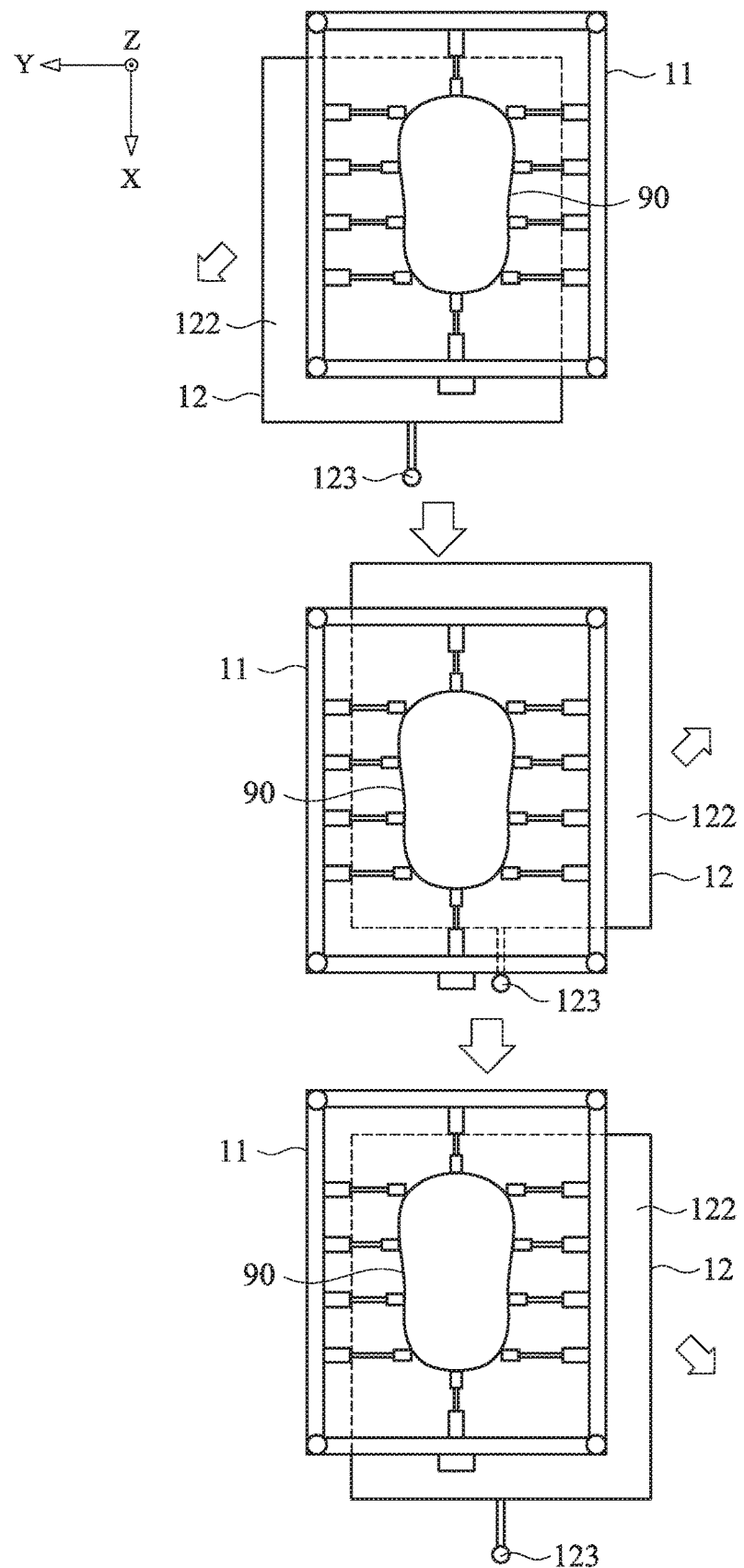
FIG. 6 schematically illustrates the movement of the trajectory detection plate of the input device detection system according to the present invention.

FIG. 6 schematically illustrates the movement of the trajectory detection plate of the input device detection system according to the present invention. After the input device 90 is enabled, the control device 14 controls the moving device 123 to move the trajectory detection plate 12. Consequently, the trajectory detection plate 12 is moved relative to the foundation 11. While the trajectory detection plate 12 is moved, the light beam LB (see FIG. 5) is also reflected to the optical sensing module 91 by the first surface layer 122. Since the movement of the trajectory detection plate 12 simulates the movement of the input device 90 on the first surface layer 122, the input device 90 generates a corresponding trajectory signal. In an embodiment, the trajectory detection plate 12 is moved along a circular trajectory, a square trajectory, a triangular trajectory or an arbitrary trajectory. Moreover, the trajectory signal from the input device 90 is transmitted to the control device 14. Then, the control device 14 analyzes and compares whether the trajectory signal from the input device 90 complies with the moving direction and moving speed of the trajectory detection plate 12. If the trajectory signal complies with the moving direction and moving speed of the trajectory detection plate 12, the control device 14 judges that the optical sensing module 91 of the input device 90 is normally operated on the first surface layer 122.

Figure 7:
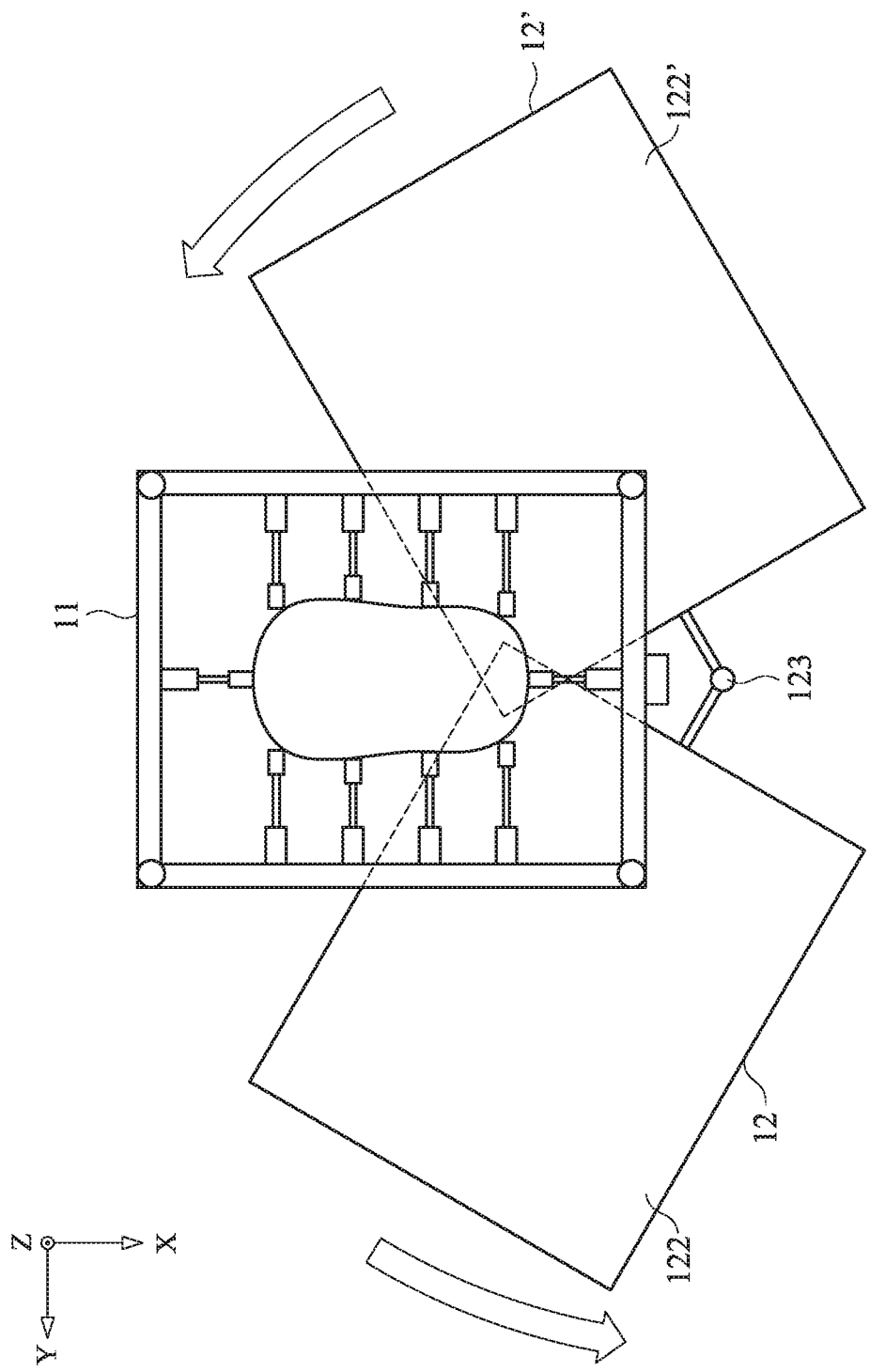
FIG. 7 schematically illustrates a process of replacing the trajectory detection plate of the input device detection system according to the present invention.

Please refer to FIG. 7. FIG. 7 schematically illustrates a process of replacing the trajectory detection plate of the input device detection system according to the present invention. As mentioned above, the control device 14 can control the moving device 123 to move the trajectory detection plate 12. Moreover, under control of the control device 14, the trajectory detection plate 12 having the first surface layer 122 is replaced with a trajectory detection plate 12' having a second surface layer 122' by the moving device 123. Similarly, the control device 14 controls the moving device 123 to move the trajectory detection plate 12'. Since the movement of the trajectory detection plate 12' simulates the movement of the input device 90 on the second surface layer 122', the input device 90 generates a corresponding trajectory signal. After the detecting process is completed, the control device 14 generates a detection result according to the result of analyzing and comparing the trajectory signal. Then, the detection result is stored in a database (not shown) of the control device 14. Moreover, when the detection result is generated, the control device 14 generates a detection completing signal simultaneously. The detection completing signal is shown on a monitor (not shown) of the control device 14. According to the detection completing signal on the monitor, the tester of the input device 90 realizes that the detecting process is completed. Then, the input device 90 is no longer pushed by the first retractable rods 115 and the second retractable rods 131. Consequently, the input device 90 can be removed from the foundation 11, and another under-test input device 90 is placed on the foundation 11.

Figure 8:
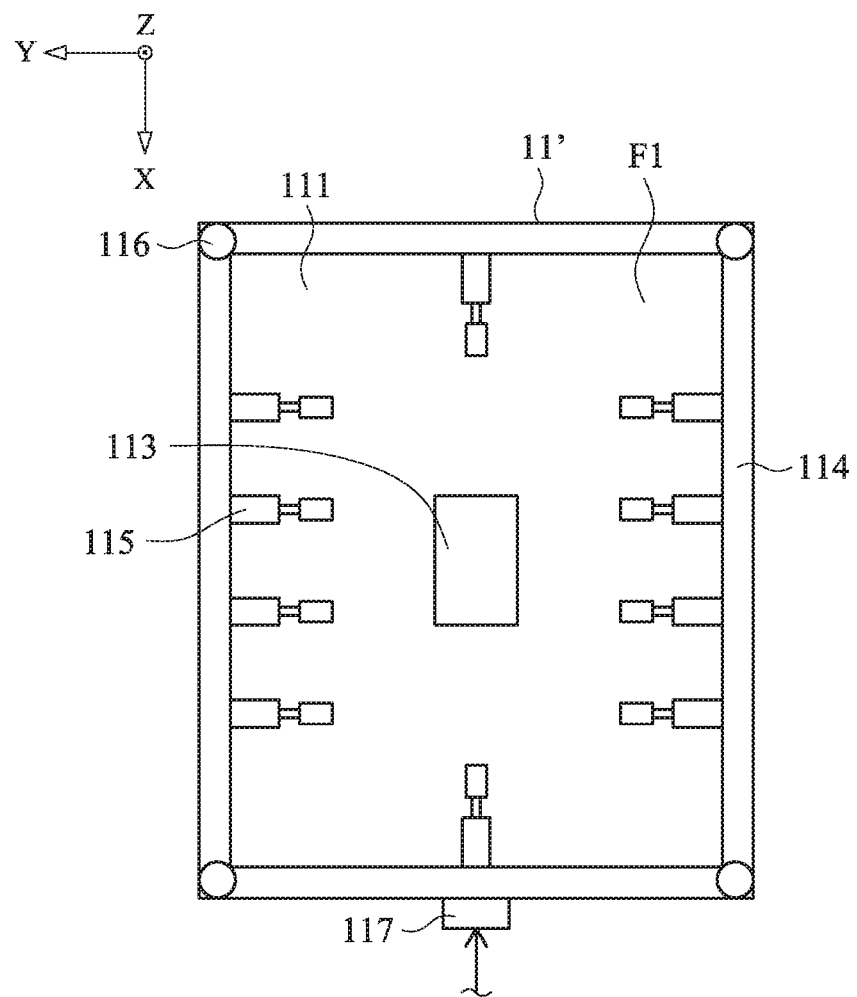
FIG. 8 is a schematic top view illustrating a second example of the foundation of the input device detection system according to the embodiment of the present invention.

Please refer to FIG. 8. FIG. 8 is a schematic top view illustrating a second example of the foundation of the input device detection system according to the embodiment of the present invention. As shown in FIG. 8, the frame 114, the frame 114, the first retractable rods 115, the horizontal status detector 116 and the first pressure pump 117 of the foundation 11' are similar to those of FIG. 2A, and are not redundantly described herein. In comparison with FIG. 2A, the detection hole 113 formed in the top surface F1 of the base plate 111 in this embodiment is larger. Moreover, in this embodiment, the concave structure is not formed in the top surface F1. Consequently, the foundation 11' can be applied to the input devices with various profiles. After the input device 90 with a different profile is placed on the foundation 11', the control device 14 controls the image pickup module 132 to capture the appearance image of this input device 90 (see FIG. 3). According to the shape, the size and the placed position of the input device 90 with the different profile, the control device 14 drives the first retractable rods 115 to be extended or retracted along the horizontal direction. Since the lateral periphery of the input device 90 is pushed by the first retractable rods 115 (see FIG. 4), the optical sensing module 91 of the input device 90 is moved to the detection hole 113. Meanwhile, the optical sensing module 91 is precisely aligned with the detection hole 113. Since the concave structure corresponding to the shape of the bottom surface of the input device is omitted, the applications of the foundation 11' are enhanced.

Figure 9A:
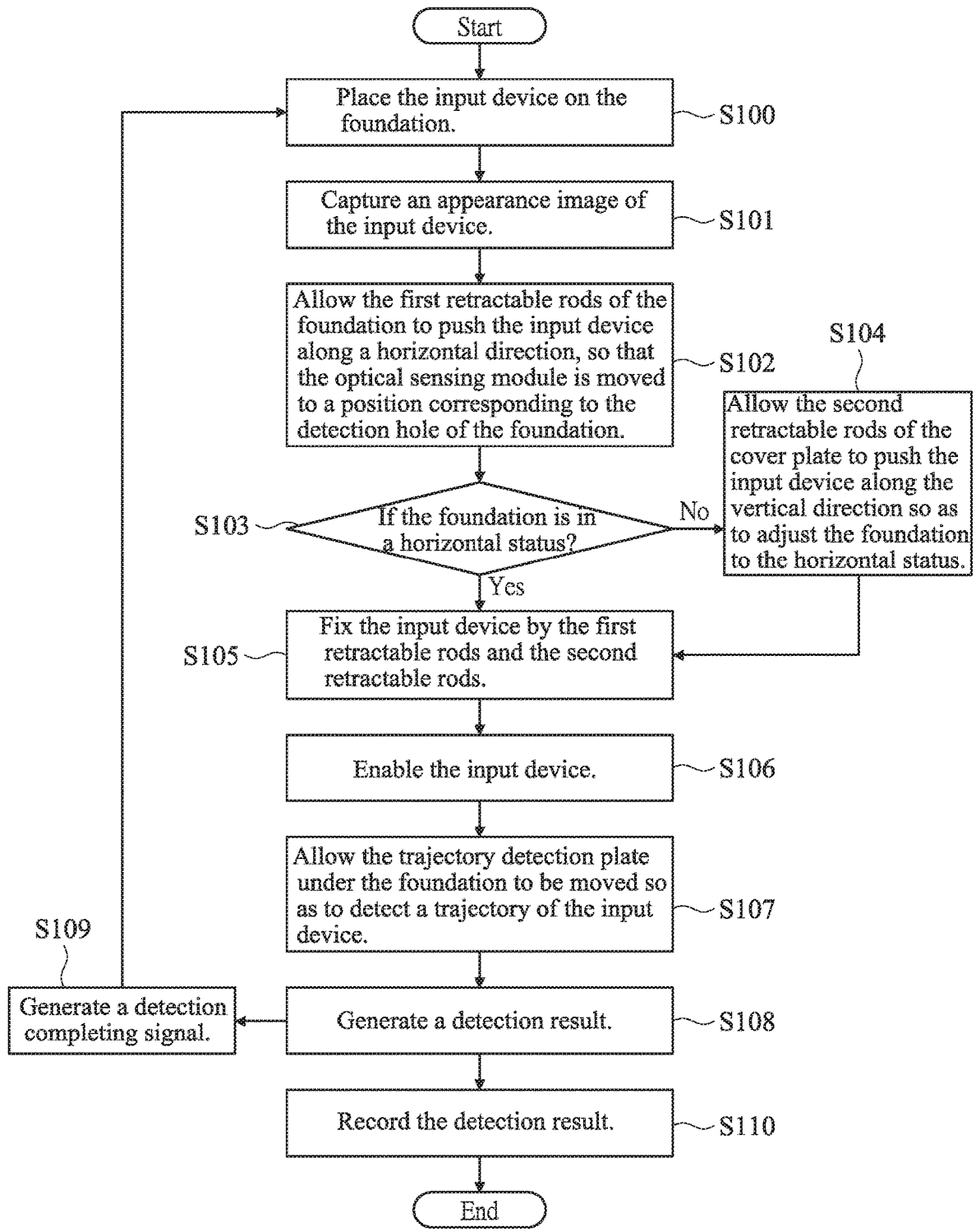
FIG. 9A is a flowchart of an input device detection method according to an embodiment of the present invention.

Please refer to FIGS. 1A, 3, 4, 5, 6 and 9A. FIG. 9A is a flowchart of an input device detection method according to an embodiment of the present invention. Firstly, the input device 90 is placed on the foundation 11 (Step S100). In the step S100, the input device 90 is in communication with the control device 14 in a wired transmission manner or a wireless transmission manner. Moreover, the input device 90 is manually or mechanically placed on the top surface F1 of the base plate 111. Then, an appearance image of the input device 90 is captured (Step S101). In the step S101, the control device 14 controls the image pickup module 132 to capture the appearance image of the input device 90. According to the appearance image, the shape, the size and the placed position of the input device 90 are analyzed. Then, the first retractable rods 115 of the foundation 11 pushes the input device 90 along a horizontal direction, so that the optical sensing module 91 is moved to a position corresponding to the detection hole 113 of the foundation 11 (Step S102). In the step S102, the control device 14 drives the first retractable rods 115 to be extended or retracted along the horizontal direction. That is, the lateral periphery of the input device 90 is pushed by the first retractable rods 115, and the optical sensing module 91 of the input device 90 is moved to the position corresponding to the detection hole 113. Consequently, the optical sensing module 91 is precisely aligned with the detection hole 113.

Please refer to FIG. 9A. After the optical sensing module 91 is aligned with the detection hole 113, a step S103 is performed to judge whether the foundation 11 is in a horizontal status. In the step S103, the at least one horizontal status detector 116 on the frame 114 detects whether the foundation 11 is in the horizontal status. If the judging condition of the step S103 is not satisfied, the second retractable rods 131 of the cover plate 13 pushes the input device 90 along the vertical direction, so that the foundation 11 is adjusted to the horizontal status (Step S104). In the step S104, the control device 14 drives the second retractable rods 131 of the cover plate 13 to push the top surface of the input device 90 along the vertical direction, and the control device 14 drives the second retractable rods 131 of the cover plate 13 to press the foundation 11 through the input device 90 until the horizontal status detector 116 detects the horizontal status of the foundation 11. After the step S104 is completed to adjust the foundation 11 to the horizontal status or the judging condition of the step S103 is satisfied, the input device 90 is fixed by the first retractable rods 115 and the second retractable rods 131 (Step S105). In the step S105, the lateral periphery of the input device 90 is continuously pressed by the first retractable rods 115 and the top surface of the input device 90 is continuously pressed by the second retractable rods 131. Consequently, the optical sensing module 91 of the input device 90 is securely and precisely aligned with the detection hole 113.

Then, the input device 90 is enabled (Step S106). In the step S106, the control device 14 enables the input device 90. After the input device 90 is enabled, the optical sensing module 91 of the input device 90 emits a light beam LB. After the light beam LB is transmitted through the detection hole 113, the light beam LB is projected to the first surface layer 122 of the trajectory detection plate 12. Then, the light beam LB is reflected to the optical sensing module 91 by the first surface layer 122. Then, the trajectory detection plate 12 under the foundation 11 is moved, so that a trajectory of the input device 90 is detected (Step S107). In the step S107, the control device 14 controls the moving device 123 to move the trajectory detection plate 12. Consequently, the trajectory detection plate 12 is moved relative to the foundation 11. While the trajectory detection plate 12 is moved, the light beam LB is also reflected to the optical sensing module 91 by the first surface layer 122. Since the movement of the trajectory detection plate 12 simulates the movement of the input device 90 on the first surface layer 122, the input device 90 generates a corresponding trajectory signal. The trajectory signal is transmitted to the control device 14.

Then, a detection result is generated (Step S108). In the step S108, the control device 14 analyzes and compares whether the trajectory signal from the input device 90 complies with the moving direction and moving speed of the trajectory detection plate 12. If the trajectory signal complies with the moving direction and moving speed of the trajectory detection plate 12, the control device 14 judges that the optical sensing module 91 of the input device 90 is normally operated on the first surface layer 122. According to the result of analyzing and comparing the trajectory signal of the input device 90, the control device 14 generates a detection result. When the detection result is generated, the control device 14 generates a detection completing signal simultaneously (Step S109). In the step S109, the detection completing signal is shown on a monitor (not shown) of the control device 14. According to the detection completing signal on the monitor, the tester of the input device 90 realizes that the detecting process is completed. Then, the input device 90 is no longer pushed by the first retractable rods 115 and the second retractable rods 131. Consequently, the input device 90 can be removed from the foundation 11. Afterward, the detection result is recorded (Step S110). In the step S110, the control device 14 stores the detection result in the database (not shown) of the control device.

Figure 9B:
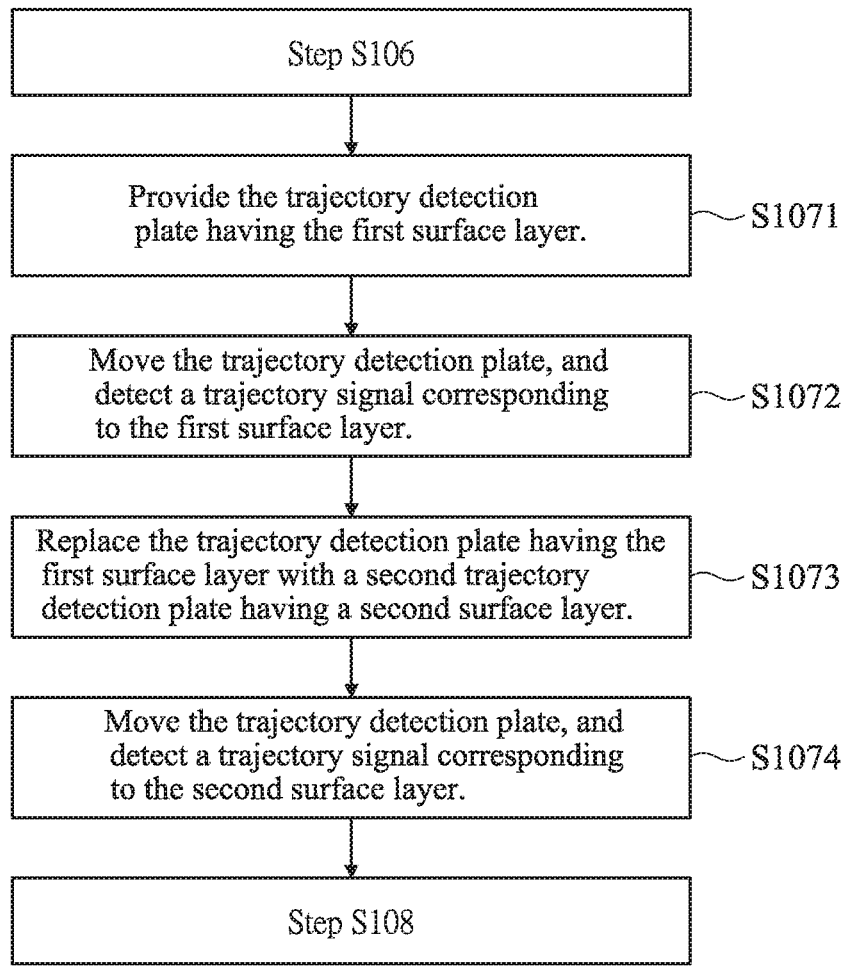
FIG. 9B is a flowchart illustrating the detailed steps of the step S107 of FIG. 9A.

Please refer to FIGS. 7 and 9B. FIG. 9B is a flowchart illustrating the detailed steps of the step S107 of FIG. 9A. Firstly, the trajectory detection plate 12 having the first surface layer 122 is provided (Step S1071). Then, the trajectory detection plate 12 is moved, and a trajectory signal corresponding to the first surface layer 122 is detected (Step S1072). Then, the trajectory detection plate 12 having the first surface layer 122 replaced with a second trajectory detection plate 12' having a second surface layer 122' (Step S1073). In the step S1073, the control device 14 controls the moving device 123 to replace the trajectory detection plate 12 having the first surface layer 122 with the trajectory detection plate 12' with the second surface layer 122'. Afterwards, the trajectory detection plate 12' is moved, and a trajectory signal corresponding to the first surface layer 122' is detected (Step S1074). In the step S1074, the control device 14 controls the moving device 123 to move the trajectory detection plate 12'. Since the movement of the trajectory detection plate 12' simulates the movement of the input device 90 on the second surface layer 122', the input device 90 generates a corresponding trajectory signal.

From the above descriptions, the first retractable rods and the second retractable rods are used to push the input device and securely and precisely position the input device on the detection region of the foundation. Consequently, the input device is not shifted during the detecting process. After the input device is placed on the foundation, the horizontal status detector detects whether the foundation is in the horizontal status. In other words, the movement of the input device on different planes can be accurately simulated. Consequently, the accuracy and the reliability of the detection result of the input device are effectively increased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An input device detection system for detecting an input device, the input device comprising an optical sensing module, the input device detection system comprising:
    a foundation comprising:
        a base plate having a top surface, a bottom surface and a detection hole, wherein the input device is supported on the top surface, the second surface is opposed to the first surface, and the detection hole runs through the top surface and the bottom surface;
        a frame disposed on the top surface of the base plate; and
        plural first retractable rods disposed on an inner surface of the frame, wherein the input device is pushed and fixed by the plural first retractable rods along a horizontal direction, so that the optical sensing module is moved to a position corresponding to the detection hole;
    a cover plate comprising plural second retractable rods, wherein the input device is pushed and fixed by the plural second retractable rods along a vertical direction, so that the foundation is in a horizontal status;
    a trajectory detection plate located under the base plate and near the bottom surface of the base plate; and
    a control device in communication with the input device, the foundation, the cover plate and the trajectory detection plate, wherein the input device, the foundation, the cover plate and the trajectory detection plate are controlled by the control device, wherein the optical sensing module emits a light beam, and the light beam is transmitted through the detection hole and projected to the trajectory detection plate, wherein when the trajectory detection plate is moved relative to the foundation and the light beam is reflected to the optical sensing module by the trajectory detection plate, the input device generates a trajectory signal.

2. The input device detection system according to claim 1, wherein the foundation further comprises at least one horizontal status detector, and the at least one horizontal status detector senses whether the foundation is in the horizontal status.

3. The input device detection system according to claim 2, wherein the at least one horizontal status detector is disposed on the base plate or the frame.

4. The input device detection system according to claim 2, wherein the horizontal status detector is a gravity force sensor or a gyroscope.

5. The input device detection system according to claim 1, wherein a concave structure is formed in the top surface of the base plate, and the input device is accommodated within the concave structure, so that the optical sensing module is aligned with the detection hole.

6. The input device detection system according to claim 1, wherein the foundation further comprises a first pressure pump, and the control device controls the first pressure pump to drive the first retractable rods to be extended or retracted along the horizontal direction.

7. The input device detection system according to claim 1, wherein the cover plate further comprises a second pressure pump, and the control device controls the second pressure pump to drive the second retractable rods to be extended or retracted along the vertical direction.

8. The input device detection system according to claim 1, wherein the cover plate comprises an image pickup module, and the appearance image of the input device is captured by the image pickup module.

9. The input device detection system according to claim 1, wherein the trajectory detection plate comprises a supporting plate, a first surface layer and a moving device, wherein the first surface layer is disposed on the supporting plate, and the light beam is reflected to the optical sensing module by the first surface layer.

10. The input device detection system according to claim 9, wherein when the moving device is enabled to move the trajectory detection plate, the trajectory detection plate is moved relative to the foundation.

11. The input device detection system according to claim 9, wherein the first surface layer of the trajectory detection plate is replaced with a second surface layer through the moving device.

12. The input device detection system according to claim 1, wherein after the control device receives the trajectory signal, the control device generates a detection result according to the trajectory signal.

13. The input device detection system according to claim 12, wherein the control device is a computing device.

14. An input device detection method for detecting an input device, the input device comprising an optical sensing module, the input device detection method comprising steps of:
    (a) placing the input device on a foundation;
    (b) capturing an appearance image of the input device;
    (c) allowing plural first retractable rods of the foundation to push the input device along a horizontal direction, so that the optical sensing module is moved to a position corresponding to a detection hole of the foundation;
    (d) judging whether the foundation is in a horizontal status, wherein if the foundation is not in the horizontal status, the input device is pushed by plural second retractable rods of a cover plate along the vertical direction, so that the foundation is adjusted to the horizontal status, wherein if the foundation is in the horizontal status, a next step is performed;
    (e) fixing the input device by the plural first retractable rods and the plural second retractable rods;
    (f) enabling the input device;
    (g) allowing a trajectory detection plate under the foundation to be moved, so that a trajectory of the input device is detected;
    (h) generating a detection result; and
    (i) recording the detection result.

15. The input device detection method according to claim 14, wherein in the step (c), the input device is accommodated within a concave structure of the foundation, so that the optical sensing module is aligned with the detection hole.

16. The input device detection method according to claim 14, wherein when the input device is enabled in the step (f), the optical sensing module emits a light beam, wherein the light beam is transmitted through the detection hole and projected to the trajectory detection plate.

17. The input device detection method according to claim 14, wherein the step (g) comprises steps of:
    (g1) providing the trajectory detection plate having a first surface layer;
    (g2) moving the trajectory detection plate, so that a trajectory signal corresponding to the first surface layer is detected;
    (g3) allowing the trajectory detection plate having the first surface layer to be replaced with a second trajectory detection plate having a second surface layer; and
    (g4) moving the second trajectory detection plate, so that a second trajectory signal corresponding to the second surface layer is detected.

18. The input device detection method according to claim 14, wherein when the detection result is generated in the step (h), a detection completing signal is further generated.

* * * * *